June 15, 1926.

H. G. CARLSON

SHEET METAL PULLEY

Filed Dec. 1, 1924

1,589,291

Inventor
Hjalmar G. Carlson
By Attorneys

Patented June 15, 1926.

1,589,291

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

SHEET-METAL PULLEY.

Application filed December 1, 1924. Serial No. 753,072.

This invention relates to a pulley formed entirely of sheet metal, particularly a flanged pulley.

The principal objects of the invention are to provide a construction in which the metal pressing operations will be few and simple in which the parts will fit together and by which they can easily be secured so as to form a very rigid and durable pulley at a very low expense.

Reference is to be had to the accompanying drawings, in which

Figure 1:
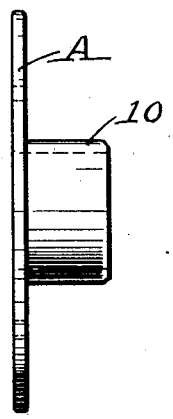
Fig. 1 is a side view of one of the parts of which the pulley is made.
Figure 3:
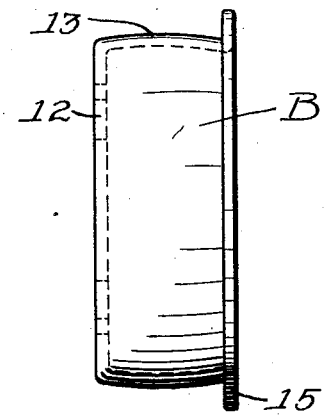
Fig. 3 is a side view of the other part.
Figure 2:
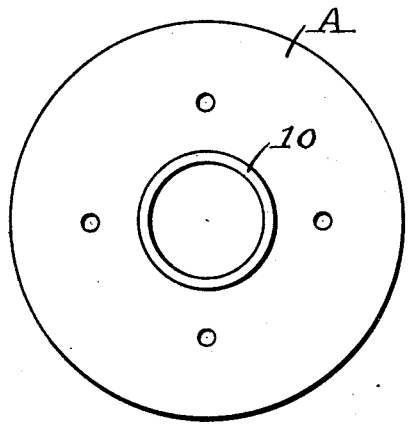
Fig. 2 is a face view of the same.
Figure 4:
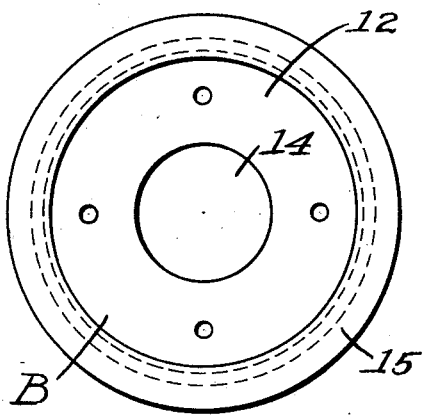
Fig. 4 is a face view of the same.
Figure 5:
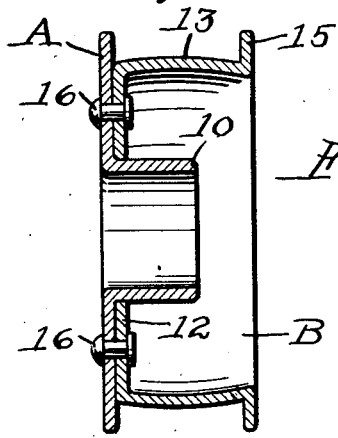
Fig. 5 is a central sectional view through the completed pulley, showing the parts assembled.

Several attempts have been made to form pulleys of sheet metal but they have necessitated complicated and numerous metal pressing operations with a correspondingly expensive installation of machinery. For the purpose of obviating this difficulty I form my pulley in two parts, A and B. The part A is formed from a circular blank and provided with a simple flat face, which, it will be seen later, constitutes not only the end of the pulley but one of the flanges. One side of this flange is provided, by a simple well known metal pressing operation, with an integral cylindrical central projection 10 to constitute a hub. This is all there is to this part of the device except that some perforations are made equally distant from the center for receiving the fastening rivets if they are to be used.

The other part, B, is formed by metal pressing operations so as to provide it with an annular wall 12 having perforations corresponding with the perforations in part A, if desired. This annular wall has a central perforation 14 for fitting the projection 10 which constitutes the hub of the pulley. This part B also is provided with a cylindrical, or preferably crowned, face or periphery 13, which, of course, is integral with the wall 12 and is provided on its free edge with an opposite flat flange 15 having the same diameter as the diameter of the part A.

These two parts are set together with the hub 12 extending through the perforation 14 and fitting therein and the flat inner face of the part A abutting against the flat rear face of the wall 14. The holes, if the article is made that way, are brought into registration and rivets 16 inserted and headed over. If it is desired, these holes and rivets can be avoided by spot welding the parts together. The projection 10 and perforation constitute means for centering the two parts in assembling.

It will be seen that the projection 10 constitutes a hub. The flat wall of the part A and the wall 12 together constitute an end of double thickness for supporting the rest of the pulley. The face of the pulley can be made flat or crowned as may be desired and it has two flanges preferably of the same diameter and thickness at opposite ends of the face of the pulley.

Thus the constitution of my pulley obviously involves comparatively few metal pressing operations and hence few machines and dies for its manufacture. Each part of the pulley can be produced from a flat blank with very few operations. It is strong and well balanced.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described but what I do claim is:—

1. As an article of manufacture, a pulley comprising two members, one member having a cylindrical portion, one edge of said cylindrical portion being turned outwardly and forming a flange, and the other edge turned inwardly, forming an inwardly extending flange, the other member being a circular plate with the central portion thereof pressed inwardly and forming the hub of the pulley, said hub portion fitting snugly in the opening formed by said inwardly extending flange, said inwardly extending flange and the circular plate being permanently secured together, and the circular plate being of a diameter sufficient to form the other flange of the completed pulley.

2. As an article of manufacture, a flanged pulley consisting of two parts, each formed of pressed metal, one part consisting of a flat circular plate with a perforation therethrough, the walls of said perforation being pressed inwardly to form a cylindrical portion constituting the hub of the pulley, the other member consisting of an annular flat plate having a central hole fitting and receiving said hub and having a circular portion extending around its circumference and constituting the periphery of the pulley and provided at the end thereof with a circular flange projecting beyond the face of the pulley, the first named plate projecting beyond the periphery of the pulley to constitute the second flange.

3. As an article of manufacture, a pulley comprising a flat circular pressed metal plate with a central perforation therethrough, the walls of said perforation being pressed inwardly to form a cylindrical portion to constitute the hub of the pulley, and another pressed metal member consisting of an annular flat plate having a central hole fitting said hub and centering it for receiving it and having a cylindrical portion extending around its circumference and constituting the periphery of the pulley and provided at the end thereof with a flat circular flange projecting beyond the face of the pulley, the first named plate projecting beyond the periphery of the pulley to constitute the second flange.

In testimony whereof I have hereunto affixed my signature.

HJALMAR G. CARLSON.